(12) United States Patent
Koizumi

(10) Patent No.: US 7,973,839 B2
(45) Date of Patent: Jul. 5, 2011

(54) SOLID IMAGE PICKUP DEVICE, IMAGE PICKUP SYSTEM AND METHOD OF DRIVING SOLID IMAGE PICKUP DEVICE

(75) Inventor: Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 11/860,065

(22) Filed: Sep. 24, 2007

(65) Prior Publication Data

US 2008/0179633 A1 Jul. 31, 2008

Related U.S. Application Data

(62) Division of application No. 09/678,296, filed on Oct. 3, 2000, now Pat. No. 7,324,144.

(30) Foreign Application Priority Data

Oct. 5, 1999 (JP) .................................... 11-284464

(51) Int. Cl.
H04N 3/14 (2006.01)
H04N 5/335 (2011.01)
(52) U.S. Cl. ........ 348/294; 348/297; 348/302; 348/308; 348/312
(58) Field of Classification Search .......... 348/294–324; 250/208.1; 257/290–292
See application file for complete search history.

(56) References Cited

U.S. PATENT DOCUMENTS

| | | | |
|---|---|---|---|
| 4,527,199 A | 7/1985 | Kinoshita et al. | 358/213 |
| 4,707,744 A | 11/1987 | Kimata et al. | 358/213.26 |
| 4,870,495 A | 9/1989 | Kinoshita et al. | 348/264 |
| 4,879,470 A | 11/1989 | Sugawa et al. | 250/578 |
| 5,406,332 A | 4/1995 | Shinohara et al. | 348/308 |
| 5,485,004 A | 1/1996 | Suzuki et al. | 250/208.2 |
| 5,698,892 A | 12/1997 | Koizumi et al. | 257/620 |
| 5,835,045 A | 11/1998 | Ogawa et al. | 341/155 |
| 5,872,596 A | 2/1999 | Yanai et al. | 348/297 |
| 5,892,541 A | 4/1999 | Merrill | 348/302 |
| 5,903,043 A | 5/1999 | Ichikawa et al. | 257/532 |
| 6,188,094 B1 | 2/2001 | Kochi et al. | 257/232 |
| 6,452,666 B1 | 9/2002 | Barna et al. | 356/5.01 |
| 6,556,244 B1 | 4/2003 | So et al. | 348/296 |
| 6,605,850 B1 | 8/2003 | Kochi et al. | 257/431 |
| 6,606,121 B1 | 8/2003 | Bohm et al. | 348/297 |
| 6,624,850 B1 | 9/2003 | Guidash | 348/308 |
| 6,633,334 B1 | 10/2003 | Sakurai et al. | 348/308 |
| 6,650,369 B2 | 11/2003 | Koizumi et al. | 348/301 |

(Continued)

FOREIGN PATENT DOCUMENTS

JP 6-197286 7/1994

Primary Examiner — Yogesh K Aggarwal
(74) Attorney, Agent, or Firm — Fitzpatrick, Cella, Harper & Scinto

(57) ABSTRACT

The solid image pickup device of the present invention comprises a photoelectric conversion part, a charge-voltage conversion part for converting electric charges from the photoelectric conversion part to voltage signals, a signal amplifier for amplifying the voltage signals generated in the charge-voltage conversion part, charge transfer means for transferring photo-electric charges from the photoelectric conversion part to the charge-voltage conversion part, and means for applying a certain voltage to a charge-voltage conversion part, wherein at least two readout operations for reading out the photo-electric charges accumulated during a period of accumulating photo-electric charges in the photoelectric conversion part via a signal amplifier.

2 Claims, 11 Drawing Sheets

U.S. PATENT DOCUMENTS

| | | | |
|---|---|---|---|
| 6,657,665 B1 | 12/2003 | Guidash | 348/308 |
| 6,661,459 B1 | 12/2003 | Koizumi et al. | 348/310 |
| 6,670,990 B1 | 12/2003 | Kochi et al. | 348/310 |
| 6,930,722 B1 * | 8/2005 | Nakamura et al. | 348/362 |
| 7,016,089 B2 | 3/2006 | Yoneda et al. | 358/482 |
| 7,110,030 B1 | 9/2006 | Kochi et al. | 348/308 |

* cited by examiner

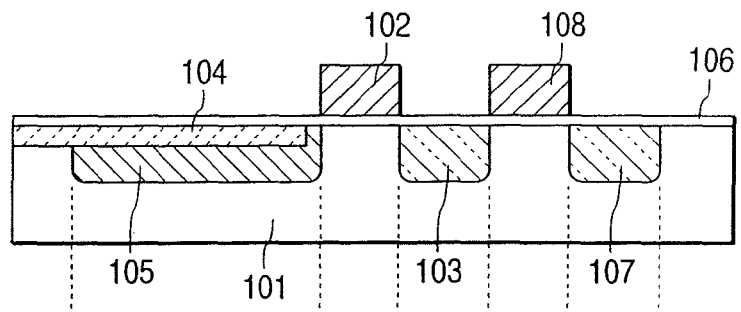
FIG. 1A
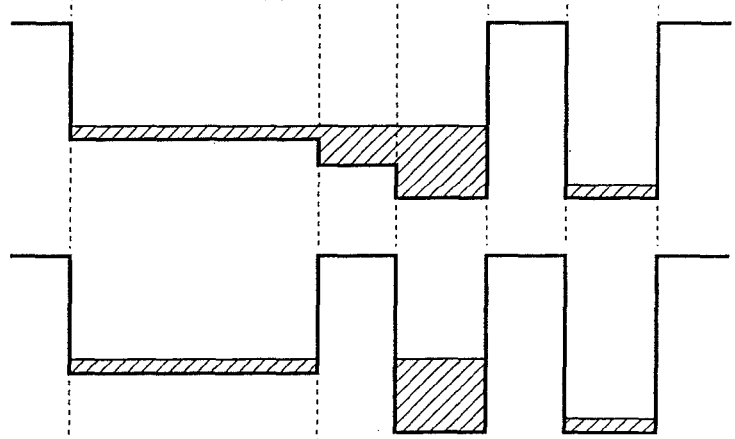
FIG. 1B
FIG. 1C
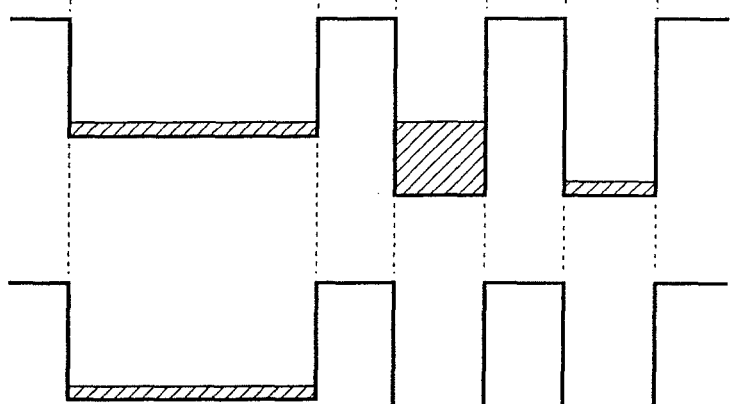
FIG. 1D
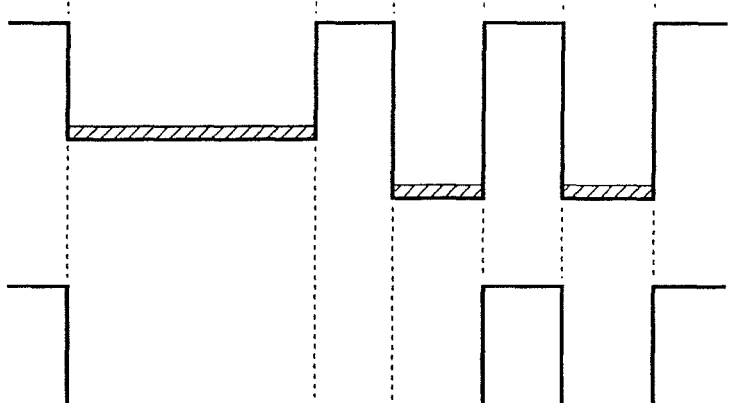
FIG. 1E
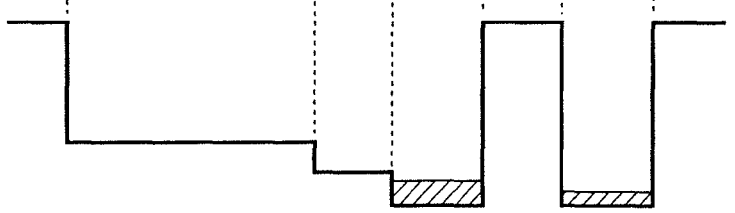

SOLID IMAGE PICKUP DEVICE, IMAGE PICKUP SYSTEM AND METHOD OF DRIVING SOLID IMAGE PICKUP DEVICE

CROSS-REFERENCE TO RELATED APPLICATIONS

This application is a divisional of U.S. patent application Ser. No. 09/678,296, filed Oct. 3, 2000 and claims benefit of the filing date of that application, and priority benefit of the filing date of Japanese patent application no. 11-284464 filed Oct. 5, 1999. The entire disclosures of these prior applications are incorporated herein by reference.

BACKGROUND OF THE INVENTION

1. Field of the Invention

The present invention relates to a solid image pickup device, an image pickup system and a method of driving the solid image pickup device. In particular, the present invention relates to a solid image pickup device comprising a photo-electric conversion part, a charge-voltage conversion part for converting electric charges from the photoelectric conversion part to voltage signals, signal amplification means for amplifying the voltage signals, charge transfer means for transferring photo-electric charges from the photoelectric conversion part to the charge-voltage conversion part, and means for inputting a certain voltage to the charge-voltage conversion part; an image pickup system; and a method of driving the solid image device.

2. Related Background Art

As representatives of solid image pickup devices, there is a device comprising a photodiode and a CCD shift register, and a device called APS (Active Pixel Sensor), comprising a photodiode and a MOS transistor.

The APS includes a photodiode, a MOS switch, an amplification circuit for amplifying a signal from a photodiode and the like in each pixel and has many merits that the "XY addressing", "making the sensor and the signal processing circuit into a single chip" or the like is achievable. In recent years, attentions have been attracted to APS owing to a promoted miniaturizing technique of MOS transistors and a raised demand for "making the sensor and the signal processing circuit into a single chip" or "reducing the consumption power".

FIG. 14 shows the pixel part of a conventional ASP and an equivalent circuit of a solid image pickup device using it. These were reported by Mr. Eric R. Fossum et al. at a work shop of IEEE in 1995. The configuration of the prior art will be briefly described below.

The photoelectric conversion part is an embedded-type photodiode (PPD) used in CCD or the like. By providing a concentrated p layer on the surface, the embedded-type photodiode can suppress the dark current occurring at its interface with $SiO_2$ on it and can provide a junction capacity also between the n layer of the accumulation part and the p layer on the surface of it, thereby increasing the saturated charge quantity of the photodiode.

The photo-signal charges accumulated in the photoelectric conversion part is read out via the charge transfer means (TX) comprising a MOS transistor to the floating diffusion region (FD).

The signal charges Qsig are voltage-converted into Qsig/CFD by the capacity of this floating diffusion region (CFD) and the signals are read out through a source follower circuit not shown in FIG. 14.

On applying an inverse bias to the n layer of the embedded-type photodiode, a depletion layer spreads from individual junctions between the concentrated p layer in the surface and the P well of the substrate in accordance with the bias. At this time, the number of electrons in the photodiode is almost equal to that of the intrinsic region sandwiched between both depletion layers and decreases in proportion to the width of the depletion layer. The number of electrons in the above intrinsic region at the time of the inverse bias=0 volt corresponds to the saturated charge quantity. When both depletion layers spread under action of the inverse bias and are connected to each other, the interior of the photodiode is depleted and the intrinsic region disappears. The inverse bias at this time is referred to as "depleted voltage (or completely depleted voltage)" hereinafter. Furthermore, when an inverse bias is applied increasingly, the electron concentration in the photodiode exponentially decreases, depending on an increase in inverse voltage. With the above sensor, if the photodiode interior is completely depleted in readout, charges generated by light are almost completely transferred to the floating diffusion region and simultaneously the charges are absent in the photodiode, thereby fulfilling the reset of electrons. Hereinafter, such a charge transfer is referred to as "depletion transfer".

FIG. 15 shows the saturated charge quantity Qsat of a photodiode, a value of voltage VFDsat ((1) and (2) of FIG. 15) of the floating diffusion region in readout of the saturated charge, and the depleting voltage (3) with respect to the saturated voltage Qsat.

Symbol A denotes the lower limit value of saturated charge required for a practical photodiode, and symbol F denotes the upper limit value of saturated charge required for a practical solid image pickup device, while Symbols B and E denote the values of saturated charge quantity at VFDsat=depleted voltage.

VFDsat is given in terms of the following formula.

$$VFDsat = Vres - Qsat/CFD$$

Vres represents the reset voltage of the floating diffusion region.

In general, the saturated voltage of a photodiode is required to be more than a certain value and its lower limit value is a value denoted by A in FIG. 15. Besides, in order to attain the above depletion transfer, it is demanded to actualize the relationship of: VFDsat≧depleting voltage, and preferably VFDsat>depleting voltage.

Thus, in case of (1) of FIG. 15, the upper limit value of depleted voltage satisfying this relationship is denoted by B of FIG. 15.

In case of VFDsat<depleted voltage, the inverse bias voltage of a photodiode becomes equal to VFD, an intrinsic region is present in the photodiode, and readout is carried out in accordance with the capacity division between the capacity by the above depletion layer and the capacity of the floating diffusion layer. Together with this, even after the readout, the amount of residual electrons close to the saturated charge quantity Qsat is present and the depletion layer does not occur. The residual electrons of this time causes an afterimage and a noise.

Accordingly, the design of the photodiode is required so that the saturated charge quantity Qsat in the photodiode meets the range C of A<Qsat<B.

The saturated charge quantity Qsat, or the depleting voltage, has a problem, however, likely to be affected by the production process. For example, it happens that only a 10% fluctuation of ion implantation dose quantity in the formation of the n layer of a photodiode brings about a change of 0.4 volts in the depleting voltage.

As a result, the yield of production lowers. As one method for avoiding these problems, the value of reset voltage Vres in the floating diffusion region is increased to obtain a state as indicated by the straight line (2) of FIG. 15, whereby the selection margins of the saturated charge quantity Qsat can be extended to the range of A-E. In this case, a higher reset voltage becomes necessary. This means that a high power source voltage must be secured to assure the signal/noise ratio and a great factor of obstructing a lower voltage of the APS lies in this point.

As well known, a high power source voltage brings about a rise in power consumption. Besides, in case of being integrated with a logic circuit, another high power source voltage must be prepared for a sensor chip independently of a low power source voltage of the logic circuit. This results in the deterioration of performances of an APS chip.

SUMMARY OF THE INVENTION

It is one object of the present invention to provide a solid image pickup device having a less amount of noise at a smaller power consumption in comparison with a conventional one, a method of driving the solid image pickup system, and an image pickup system.

It is another object of the present invention to provide a solid image pickup device capable of performing depletion transfer without raising the power source voltage or the reset voltage, a method of driving the solid image pickup system, and an image pickup system.

The present invention provides a method of driving a solid image pickup device equipped with pixels, each of the pixels comprising a photoelectric conversion part and output means for outputting signals from the photoelectric conversion part, which method comprises dividing photo-electric charges accumulated in the photoelectric conversion part during one unit of accumulation period and reading out the charges via the output means.

The present invention provides a method for driving a solid image pickup device comprising a photoelectric conversion part, a charge-voltage conversion part for converting electric charges from the photoelectric conversion part to voltage signals, signal amplification means for amplifying the voltage signals generated in the charge-voltage conversion part, charge transfer means for transferring photo-electric charges from the photoelectric conversion part to the charge-voltage conversion part and reset means for resetting the charge-voltage conversion part by applying a predetermined reset voltage thereto, which method comprises, in a readout period of reading out from the photoelectric conversion part the photo-electric charges accumulated in the photoelectric conversion part during one unit of accumulation period, transferring a part of the photo-electric charges from the photoelectric conversion part to the charge-voltage conversion part, and performing a first readout operation of reading out output signals amplified by the amplification means to a signal output line, and then resetting the charge-voltage part, transferring the rest of the photo-electric charges from the photoelectric conversion part to the charge-voltage conversion part and performing a final readout operation of reading out the output signal amplified by the amplification means to the signal output line.

Further, the present invention provides a solid image pickup device equipped with pixels, each of the pixels comprising a photoelectric conversion part and output means for outputting signals from the photoelectric conversion part, wherein the device further comprises a circuit for dividing photo-electric charges accumulated in the photoelectric conversion part during one unit of accumulation period and reading out the charges via the output means.

Furthermore, the present invention provides a solid image pickup device comprising a photoelectric conversion part, a charge-voltage conversion part for converting electric charges from the photoelectric conversion part to voltage signals, signal amplification means for amplifying the voltage signals generated in the charge-voltage conversion part, charge transfer means for transferring photo-electric charges from the photoelectric conversion part to the charge-voltage conversion part and reset means for resetting the charge-voltage conversion part by applying a predetermined reset voltage thereto, wherein the device further comprises a control circuit for control so as to, in a readout period of reading out from the photoelectric conversion part the photo-electric charges accumulated in the photoelectric conversion part during one unit of accumulation period, transfer the photo-electric charges from the photoelectric conversion part to the charge-voltage conversion part and perform a first readout operation of reading out output signals amplified by the amplification means to a signal output line, and then to reset the charge-voltage conversion part, transfer the rest of the photo-electric charges from the photoelectric conversion part to the charge-voltage conversion part and perform a final readout operation of reading out the output signal amplified by the amplification means to the signal output line.

According to the present invention, the photo-electric charges remaining in the photoelectric conversion part can be read out without raising the reset voltage so much by performing a readout operation twice or more in the case of reading out the photo-electric charges accumulated in the photoelectric conversion part during one unit of accumulation period. Furthermore, if summing the output signals read out, a wide dynamic range of signals can be obtained.

And, it is to be noted that the present invention differs from a known art which comprises reading out the signals accumulated during the first accumulation period, entering the second accumulation period, and then reading out the signals accumulated during the second accumulation period and extending the dynamic range by summing those signals.

BRIEF DESCRIPTION OF THE DRAWINGS

FIGS. 1A, 1B, 1C, 1D and 1E are schematic illustrations of a pixel part configuration of a solid image pickup device according to the present invention and its operation;

DETAILED DESCRIPTION OF THE PREFERRED EMBODIMENTS

Referring to FIGS. 1A to 1E, 2 and 3, the basic operation principle of the present invention will be described in further details.

FIGS. 1A to 1E typically show relations between a partial section of a solid image pickup device and its potential for explaining the principle of the present invention.

Figure 2:
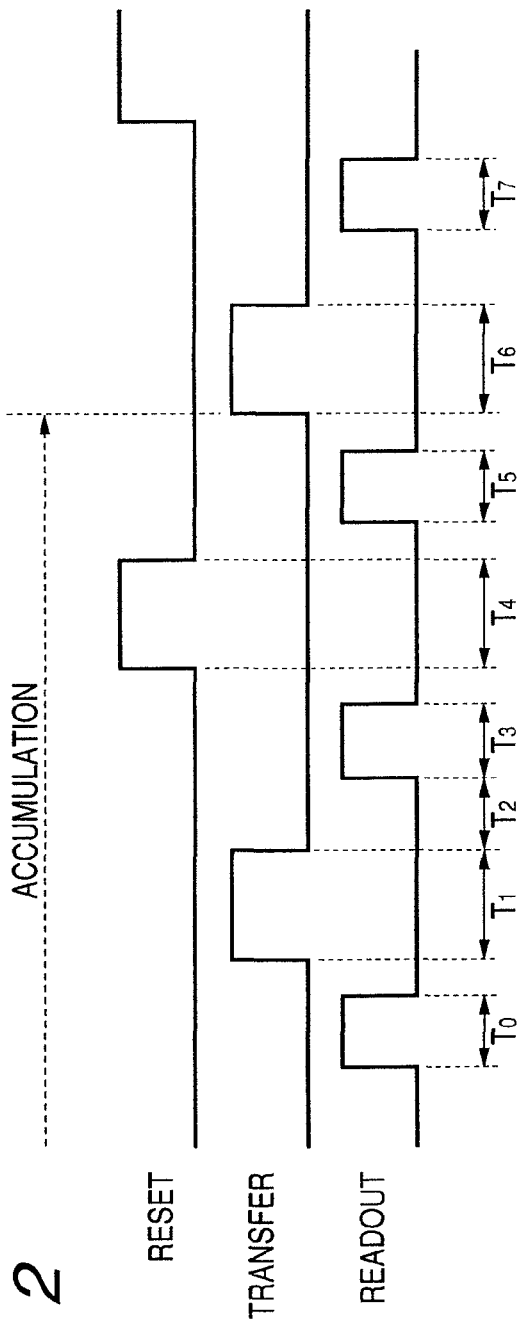
FIG. 2 is a driving timing chart of the pixel part used for the present invention.

FIG. 2 is a driving timing chart showing a method of driving a solid image pickup device according to the present invention.

Figure 3:
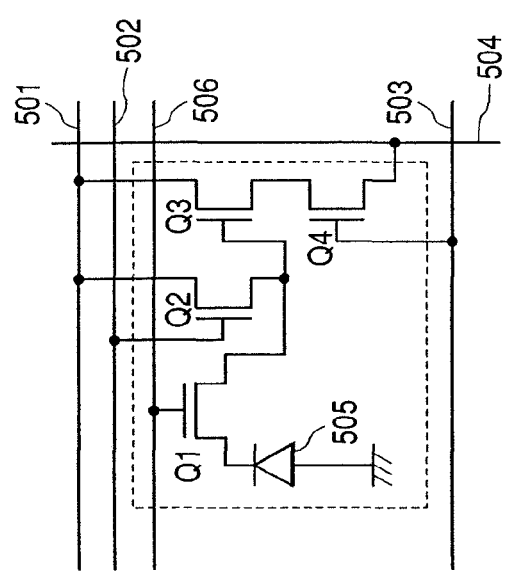
FIG. 3 is a representative circuit diagram of the pixel part used for the present invention.

FIG. 3 is a circuit diagram of one pixel in a solid image pickup device according to the present invention.

FIG. 1A shows a section of the portion including a photodiode as a photoelectric conversion part, a transfer gate as charge transfer means, a floating diffusion region as a charge-voltage conversion part (semiconductor diffusion region) and a reset switch as reset means.

Numeral 101 denotes a P well to function also as the anode of the photodiode; 102: the transfer gate; and 103: the floating diffusion region comprising n-type semiconductor.

Numeral 104 denotes a surface p region of the photodiode which comprises a p-type semiconductor and numeral 105 denotes an n region to function the cathode of the photodiode which comprises an n-type semiconductor, while an embedded photodiode is formed by the presence of this surface P region. Numeral 106 denotes an insulating film made of silicon oxide or the like and numeral 17 denotes a reset region made of an n-type semiconductor to which a predetermined reset voltage is applied via wiring or the like, while the reset region is kept at a predetermined potential. Numeral 108 denotes a reset gate of the reset switch for resetting the floating diffusion region to a predetermined potential. The n region 105 and the floating diffusion region 103 partly serves for a source and a drain region of the reset switch. The floating diffusion region 103 and the reset region 107 partly serves for a source and a drain region of the reset switch. The floating diffusion region 103 is connected to a gate of amplification transistor (not shown) serving for signal amplifier means and serves for the input part of the signal amplification means.

And, output means is composed of the transfer gate, the floating diffusion region, the reset switch and the amplification transistor and used to read out the photo-electric charges (here, electrons) accumulated in the photodiode.

The circuit diagram of one pixel of the solid image pickup device in which this configuration is used becomes as shown in FIG. 3, Numeral 505 denotes a photodiode and Symbol Q1 denotes a transfer switch; Q2: a reset switch; and Q3: an amplification transistor. Symbol Q4 denotes a selection switch not only for selecting a pixel and but also for reading out an output signal current-amplified from the amplification transistor.

FIG. 1B shows a state during the transfer of a part of charges at ON state of the transfer switch, FIG. 1C shows a state immediately after the transfer switch turns OFF, FIG. 1D shows a state immediately after the reset switch turns OFF after the reset switch turns ON to reset the floating diffusion region, and FIG. 1E shows a state in which the transfer switch turns ON again to depletion-transfer the residual charge.

In the temporal sequence of FIGS. 1A, 1B, 1C, 1D and 1E, the operation proceeds.

The outline of the driving timing including the above operation will be described referring to FIG. 2.

Incidentally, "reset" in FIG. 2 is not limited to a driving pulse to a MOS transistor for resetting and indicates the reset operation in general, while the pulse being at the high (ON) state indicates the execution of its reset operation. On the other hand, the same is applied for "readout" and this "readout" indicates to the readout operation in general and the pulse being at the high (ON) state indicates the execution of its readout operation.

First, the accumulation of photo-electric charges to a photodiode begins.

According to the need, the selective switch Q4 turns ON to read out a signal based on the reset voltage of the floating diffusion region 103 during the period T0. Since this signal is amplified by means of an amplification transistor, this signal can be regarded as the noise signal of this pixel.

Next, during the period T1, the transfer switch turns ON as shown in FIG. 1B to transfer a part of the photo-electric charges from the n region 105 of the photodiode 505 to the floating diffusion region 103 midway through the accumulation period.

After the transfer, as shown in FIG. 1C, the rest of the photo-electric charges remains with a photodiode exposed to intense light near a saturated state. With a photodiode exposed to very weak light, all charges may be transferred in some cases.

During the period T3, the selective switch Q4 turns ON to read out the output signal based on the charge transferred to the floating diffusion region 103.

And, during the period T4, the reset switch Q2 turns ON to reset the potential of the floating diffusion region. The state after the reset is shown in FIG. 1D of this pixel.

Furthermore, if necessary, the selective switch Q4 turns ON during the period T5 to read out the signal based on the reset voltage of the floating diffusion region 103. Since this signal is amplified by means of the amplification transistor, this signal can be regarded as a noise signal of this pixel.

During the period T6, again, the transfer switch turns ON to put the accumulation period to end and to transfer the rest of the photo-electric charges from the n region 105 of the photodiode 505 to the floating diffusion region 103. The state at this time is shown in FIG. 1E.

Unless the accumulation period is controlled by a shutter such as mechanical shutter outside the solid image pickup device, strictly speaking, the accumulation period at the transfer during the period T6 becomes longer than that at the transfer during the period T1. Since the accumulation time (exposure time) prior to the period T1 is sufficiently long, however, the time from the end of the period T1 to the start of the period T6 is one-hundredth of the accumulation time at most and negligible.

After the completion of the period T6, since the n regions 105 of all photodiodes 505 are depleted, all photodiodes are reset to the initial state. At this time, if a photodiode is exposed to light, the next accumulation period starts from after the completion of this period T6.

Furthermore, during the period T7, the selective switch Q4 turns ON to read out the signal based on the transfer charge of the floating diffusion region 103. And, in a circuit outside the pixel, if necessary, the signal read out during the period T3 and the signal read out during the period T7 are summed.

After the completion of the period T7, the reset switch Q2 turns ON again to reset the potential of the floating diffusion 103.

The operation by this embodiment will be described in details.

Here, referring to FIG. 15 again, the case where the saturated charge amount Qsat of a photodiode lies between B-F is taken into consideration.

In this case, if the reset voltage applied to the floating diffusion 103 is raised to maintain the condition of VFDsat>depleting voltage between B-F, the depletion transfer can be actualized by one-time transfer operation.

Figure 15:
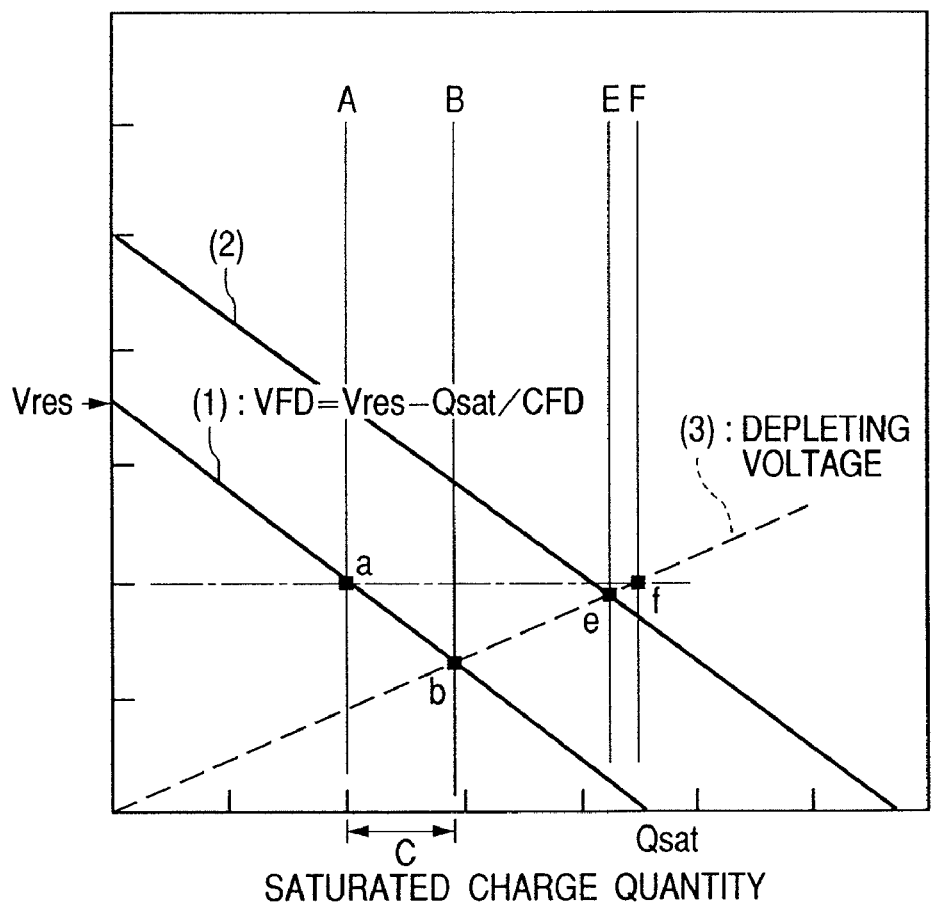
FIG. 15 is a graph showing a relationship between the saturated charge quantity of a photodiode and the potential of the floating diffusion.

In contrast, if the reset voltage is lowered like the straight line (1) in FIG. 15, a large amount of charges remains in a photodiode even by means of a transfer operation because the relation VFDsat<depleting voltage is maintained according to the relations (1) and (3) in FIG. 15 when the transfer switch is opend at a state that charges corresponding to the saturated charge quantity are accumulated in the photodiode (the transfer switch turns ON with the transfer gate 102 kept at the high level during the period T1 of FIG. 2). This situation is just as shown in FIG. 1B.

With a certain method out of the prior art, the transfer switch is closed at this state (the transfer switch turn OFF with the transfer gate 102 kept at the low level as in the period T2 of FIG. 2) to start the next accumulation. Thus, in a photodiode, at the time of reading out the signal charges accumulated in the next accumulation period, signals mixed with the residual charges which have not been completely transferred at the preceding time generate to result in the occurrence of an afterimage.

If the method of further lowering the depleting voltage is adopted to solve this problem, the charge amount allowed to be handled in a solid image pickup device decreases and the solid image pickup device becomes impossible in fully exhibiting its performance. Such being the case, the power source has been forced to be raised to secure the handled charge amount.

Accordingly, it was difficult to use a fine MOS transistor in the pixel part and making the APS sensor finer has become difficult.

In the present invention, after the completion of the first signal readout period T3, resetting is performed with the reset gate 108 kept at the high level during the reset period T4 of FIG. 2. Then, as shown in FIG. 1D, the floating diffusion region 103 serving for the input of signal amplification means is once reset. Thereafter, during the period T6, the transfer switch is opened with transfer gate 102 kept at the high level to perform a signal transfer, and residual charges are read out as shown in FIG. 1E then, during the period T7, to read out the signal portion that could not be read out at the preceding signal readout. In this manner, the photo-electric charges accumulated in the photodiode is entirely transferred and the photodiode is completely depleted.

After this, if resetting the floating diffusion region is carried out, the afterimage to be generated in this accumulation period vanishes.

Besides, if necessary, a third readout operation may be carried out further after once resetting the floating diffusion region 103 serving for the input part of signal amplification means. As a matter of fact, a fourth time and further readout operation may be carried out.

Furthermore, on repeating the above readout operation by the times in which the charges in the photodiode can be fully read out, the maximum charge quantity by which the photodiode can be handled without any afterimaage can be read out.

Besides, in the present invention, by summing the signals from the above signal amplification means, e.g. by summing the three-fold outputs from the signal amplification means obtained by three-fold readout operations as mentioned above, a greater amount of photo-electric charge signals can be also read out.

Though there was formerly a way of thinking to sum the output signals, such a technique was to sum the outputs substantially different in accumulation time as represented by a photometric sensor of a camera.

Besides, as a technique of summing the signals identical in accumulation time, a technique of summing the signals of other pixels is referred to as represented by color processing.

In contrast to the above, in the embodiments of the present invention, signals of an identical pixel for one unit of accumulation time is devided and read to sum the signals.

Several summing means exist and as one example, after digital-converting an output from the signal amplifying means, an AD converter for digitally adding and a digital addition circuit can be used. Besides, an addition circuit for adding outputs of individual times after weighted may be adopted, and the weighted addition permits the sensitivity and gamma to be varied with different ranges of light quantity. Besides, an analog adder for the analog addition may be used before the digital conversion.

Especially in case of using an embedded-type photodiode as the photodiode, no noise such as reset noise is heaped in every each transfer operation, so that the added information is not inferior to the information read out by one-time readout with an elevated voltage at all.

This point will be described below in further details.

By the times where all charges in the photodiode can be transferred as mentioned above, the above transfer/readout operation is repeated to add the obtained signals. Here, it is important that even if read out charges disperse at the time of individual readout, the readout charges are added by using an embedded-type photodiode to finally read out all charges, thereby obtaining the whole charge amount. Accordingly, the noise due to the division of readout is not included. A specific example will be taken in the description. As a result of accumulation, 100 charges are accumulated. If 50 charges are read out at the first time and 40 charges are read out at the second time, only 10 charges remain in an embedded-type photodiode and consequently the third time read out becomes 10 charges. Thus, the sum results in 100 charges. Principally, the number of charges fluctuates at individual times and there is a case where 48 charges and 38 charges are read out at the first and the second times, but in this case only 14 charges remain in the embedded-type photodiode and consequently the third time readout becomes 14 charges. Thus, the sum results in 100 charges.

As a result, a photodiode has only to satisfy the condition capable of transferring a desired amount of saturated charge Qsat: Vres>depleting voltage, and a still lower voltage is executable than in the prior art.

As mentioned above, according to the present invention, readout operations of more than twice permits the photo-electric charges remaining in the photoelectric conversion part to be read out, and further by adding the readout signals, a wide dynamic range of light signal can be obtained.

As a matter of course, the present invention is effective for either of a linear sensor with pixels arranged in one dimension and an area sensor with pixels arranged in two dimension, but in an area sensor having a strong need for pixel reduction, the present invention is more effectively used because there are many restrictions for the type and number of transistor and no circuitry measure cannot be taken.

Embodiment 1

The equivalent circuit diagram of the pixel used in this embodiment is the same as that shown in FIG. 3, and in this embodiment this pixel is arranged in two-dimensions to form an area sensor.

In FIG. 3, Numeral 505 denotes an embedded-type photodiode corresponding to the photoelectric conversion part. As an embedded-type photodiode in this embodiment, an n-type accumulative layer for accumulating photo-electric charges and a P$^+$-type layer comprising a p-type semiconductor of a high impurity for suppressing the surface dark current between this n-type layer and an insulating layer thereon were provided in a well comprising a p-type semiconductor formed in the substrate to form an embedded-type photodiode as shown in FIG. 1. The depleting voltage of this photodiode is 1.0 volt.

An nMOS transistor was used for an input transistor of a source follower amplifier as the signal amplifying means Q3, and the nMOS transistor was used for selecting a reading out row as a selection switch Q4.

Though not shown, a constant-current load is connected to a signal output line 504 as the load of the source follower.

As the reset switch Q2 for resetting the input terminal of the source follower, an n MOS transistor was used.

As the transfer switch Q1 for transferring a photo-electric signal of the photodiode 505 to the input part, a transfer gate was provided on the region between the n layer of the photodiode and the floating diffusion layer. This transfer gate corresponds to charge transfer means for transferring charges to the input part of the source follower as the signal amplification means.

Numeral 501 denotes a power source line applying a reference voltage for the reset and for the amplification; 502: a reset switch line for controlling the operation of the reset switch Q2; 503: a selective switch for controlling the operation of the selective switch Q4; and 506: a transfer switch line for controlling the operation of the transfer switch.

Figure 4:
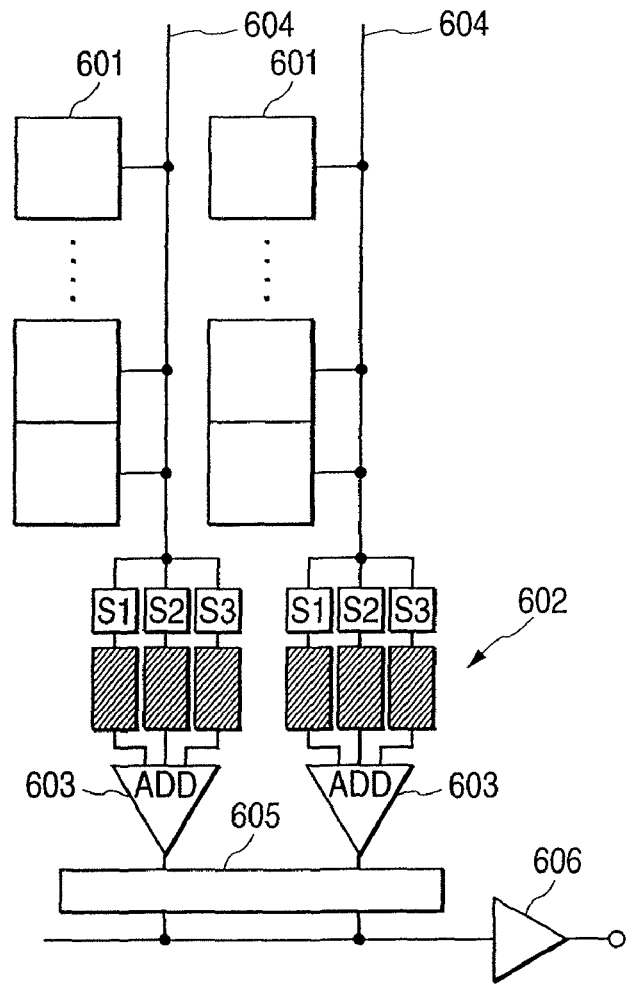
FIG. 4 is a schematic circuit diagram of a readout circuit with an addition circuit used for the present invention.

FIG. 4 is a schematic circuit diagram of the readout circuit equipped with adder means used in the present invention.

In FIG. 4, Numerals 601 denotes a pixel, as a simplified representation of the pixel shown in FIG. 3.

Output of each individual pixel is read out onto the output signal retention means 602 connected to a signal output line 604. For the output signal retention means 602 for once retaining an output signal, a plurality of capacity elements can be specifically used. In this embodiment, at the primary (first) readout, a switch S1 in FIG. 4 turns ON/OFF to retain an output signal in a capacity. At the secondary readout, a switch S2 in FIG. 4 turns ON/OFF to retain an output signal in another capacity. At the final (third) readout, a switch S3 in FIG. 4 turns ON/OFF to retain an output signal in yet another capacity.

The respective signals retained in individual capacities are added by the analog adder as signal addition means 603, converted in time series signals by a horizontal scanning circuit 605 and outputted via an output amplifier 606.

The circuit of FIG. 4 contains no substraction processing means, but can also be so configured as to include the substraction processing means in the output signal retention means 602. In this case, signals subjected to the subtraction processing and freed of noises are added in the output signal addition means 603, outputted to an output line by the horizontal scanning circuit 605 and outputted via the output amplifier 606.

Figure 5:
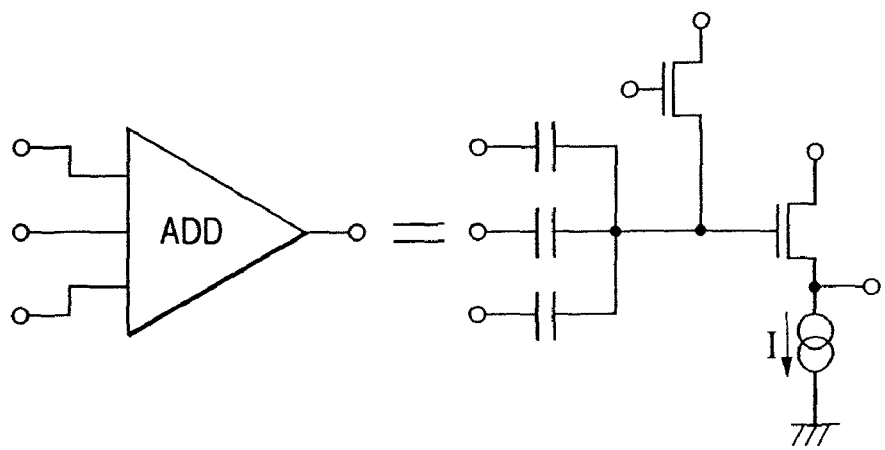
FIG. 5 is an illustration of one example of the addition circuit used for the present invention.

As the addition means 603, a clamp type addition circuit as shown in FIG. 5 can also be used.

In FIG. 5, capacity elements (clamp capacities) are connected in series to three terminals and an amplification transistor comprising a reset switch and a source follower is connected to the output side of a capacity element. The output signals that have been read out are added by three clamp capacities and outputted from the amplification transistor.

The outline of the driving timing is as follows.

By the OFF state or with shutter opening of the transfer switch Q1, the exposure to the phototransistor Q1 begins.

After the lapse of a one-field scanning period or a period equivalent to a one frame scanning period, the input part of a source follower is reset by turning the reset switch Q2 from ON to OFF, then and set to a floating state.

Next, the transfer switch Q1 turns ON/OFF to transfer a part of photo-electric charges accumulated in the photodiode 505 to the input part of the source follower.

Not only by turning the selective switch Q4 of a pixel ON but also by ON/OFF of the switch S1, an output signal is retained in the capacity 602.

Again, the reset switch Q2 turns ON/OFF and the input part of the source follower is reset and set to a floating state. The transfer switch Q1 turns ON/OFF to transfer a part of the rest of photo-electric charges accumulated in the photodiode 505 to the input part of the source follower.

Similarly to the above preceding, to obtain a second readout signal this time, the selective switch Q4 of a pixel turns ON and the switch S1 turns ON/OFF to retain an output signal in the capacity 602.

To obtain the third readout signal, the reset switch Q2 turns ON/OFF and the input part of the source follower is reset and set to a floating state. Then, the transfer switch Q1 turns ON/OFF to transfer a part of the rest of photo-electric charges accumulated in the photodiode 505 to the input part of the source follower. And the selective switch Q4 of a pixel turns ON, the switch S1 turns ON/OFF to retain an output signal in the capacity 602.

According to this embodiment, even in case of transferring a signal from the photodiode kept in a saturated charge and reading it out, the photodiode can be completely depleted by three times of the transfer and readout operation. In a photodiode of a small accumulated charge amount, the charges are completely transferred by the second transfer operation and the photodiode is completely depleted. Furthermore, in some photodiodes of a still smaller accumulated charge amount, the depleted reset is attained by the first transfer operation.

Formerly, to ensure its output signal amplitude at 2.5 volts, the source follower had to be driven at a power supply voltage=5.0 volts and a reset voltage=3.5 volts.

On the other hand, according to this embodiment, in spite of lowering the power supply voltage and the reset voltage to 3.3 volts and 1.8 volts, respectively, good light signal can be obtained which is equivalent to the conventional one.

Besides, to attain the above performance, the power supply voltage is required to be 5.0 volts and a 0.8 µm rule MOS transistor process had to be used formerly, whereas the power supply voltage can be set to 3.3 volts and a 0.35 µm rule MOS transistor process can be used according to this embodiment.

Embodiment 2

The physical configuration of individual pixels and the circuitry of a solid image pickup device according to Embodiment 2 are the same as those Embodiment 1.

Figure 6:
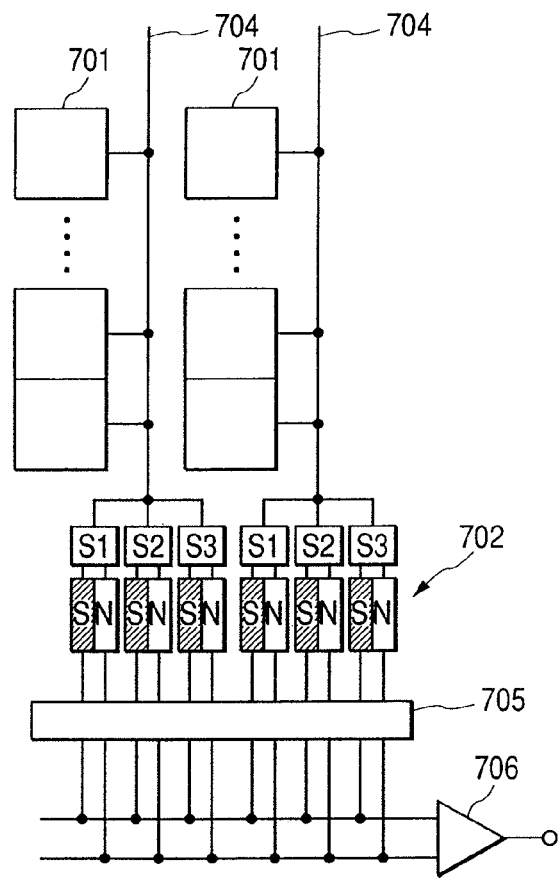
FIG. 6 is a circuit diagram of the readout circuit with another addition circuit used for the present invention.

Difference from Embodiment 1 lies in using the circuit shown in FIG. 6 as a readout circuit.

FIG. 6 is a schematic circuit diagram of a readout circuit with addition means, used in the present invention.

Output of each pixel is read out by the output signal retention means 702 connected to a signal output line 704. For output signal retention means 702 for once retaining an output signal, specifically, a plurality of capacity elements can be used. In case of this embodiment, the switch S1 in FIG. 5 turns ON/OFF at the primary (first) readout to retain a noise signal and an output signal in a capacity. At the second readout, the switch S2 turns ON/OFF to retain a noise signal and an output signal in another capacity, and at the final (third) readout, the switch S3 turns ON/OFF to retain a noise signal and an output signal in yet another capacity.

The respective noise and output signals retained in individual capacities are converted into time series signals at the horizontal scanning circuit 705 and outputted from the output amplifier 706.

Figure 7:
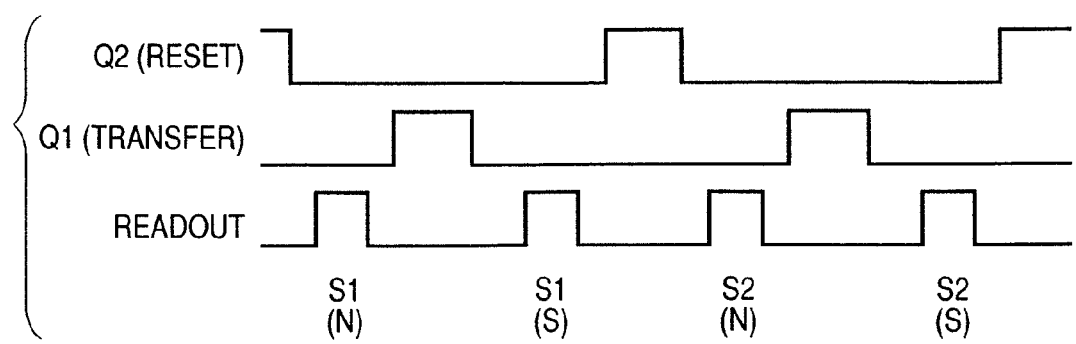
FIG. 7 is a driving timing chart of the pixel part used for the present invention.

The drive timing chart is shown in FIG. 7.

After turning the reset switch Q2 from ON to OFF, the input part of the source follower is reset and is set to a floating state. The selective switch Q4 of a pixel turns ON, the reset noise generated by this reset operation is read out to the output signal line 704 and one of the switch S1 turns ON/OFF to transfer the noise signal to the capacity for retaining a noise signal. The high level pulse S1 (N) for readout in FIG. 7 is a signal for opening one of the switch S1.

Next, the transfer switch Q1 turns ON/OFF and a light signal is transferred from the photodiode 505 to the input part of the source follower to overlap the light signal component on the reset noise remaining in the input part. The selective switch Q4 turns ON to read out this light signal onto the output line 704 and retain this signal in another capacity by opening the other of the switch S1. The high level pulse S1 (S) for readout in FIG. 7 is a signal for opening the other of the switch S1.

Thereafter, again, the reset switch Q2 turns ON/OFF and the input part of the source follower is reset and set to a floating state. Similarly to the above preceding, to obtain the second readout signal this time, the switch S2 successively turns ON/OFF by means of high level pulses S2 (N) and S2 (S) to retain output signals in respective capacities together with reset noises and light signals.

Furthermore, to obtain the third readout signal, the switch S3 successively turns ON/OFF by means of HIGH level pulses S3 (N) and S3 (S), similarly to the above, to retain a noise and an output signal in respective capacities.

In Embodiment 2, the photodiode and the reset voltage are designed so as to be able to transfer the whole charge in an embedded-type photodiode kept in a saturated state or in an accumulated state of the maximum accumulated charge on the system.

Formerly, to ensure the output signal amplitude of a source follower at 2.5 volts, the device had to be driven at a power supply voltage of 5.0 volts and a reset voltage of 3.5 volts.

On the other hand, according to this embodiment, in spite of lowering the power supply voltage and the reset voltage to 3.3 volts and 1.8 volts, respectively good light signal can be obtained which is equivalent to the conventional one.

Besides, to attain the above performance, the power supply voltage is required to be 5.0 volts and a 0.8 μm rule MOS transistor process had to be used formerly, whereas the power supply voltage can be set to 3.3 volts and a 0.35 μm rule MOS transistor process can be used according to this embodiment.

Embodiment 3

Figure 8:
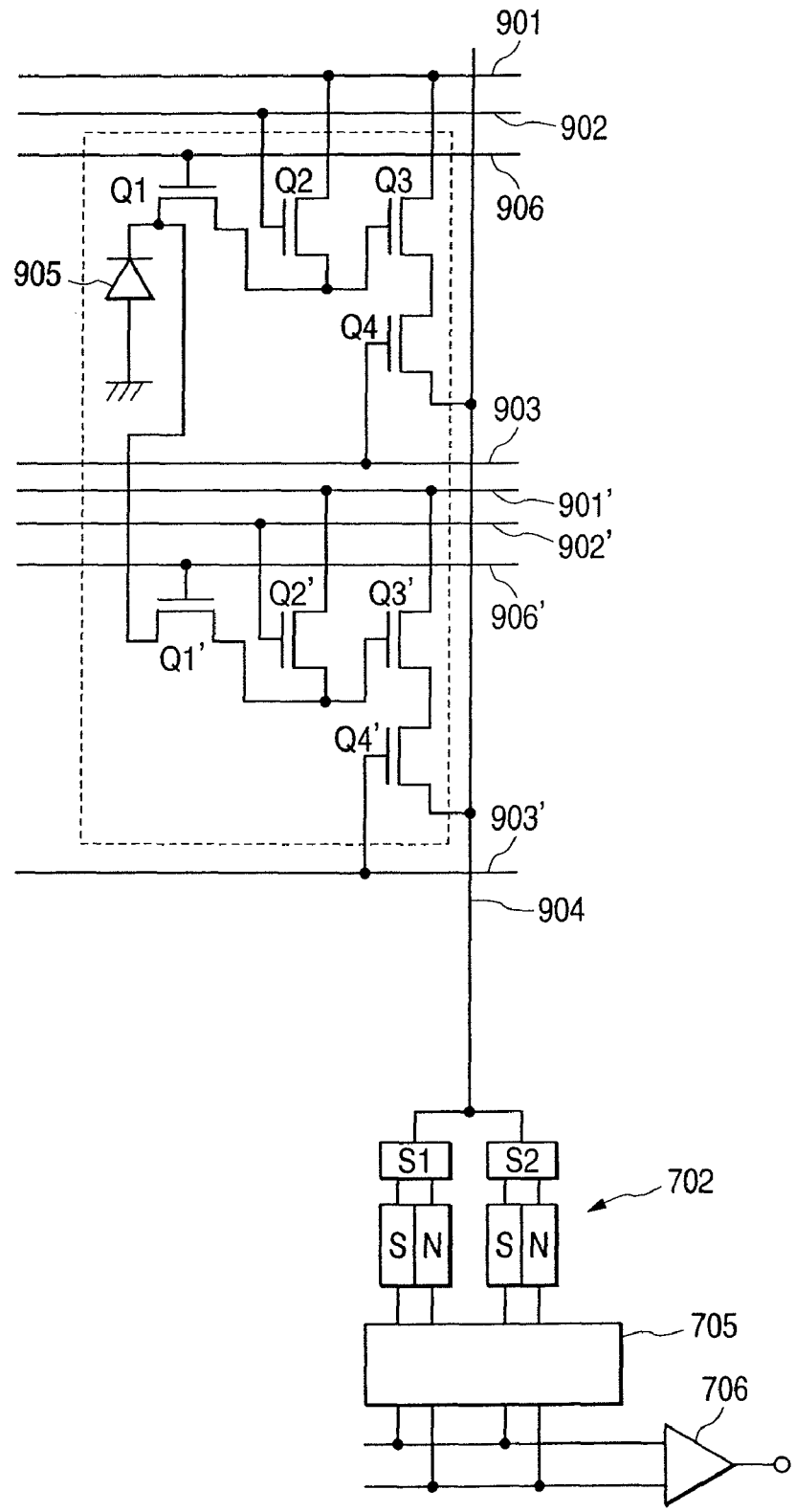
FIG. 8 is a circuit diagram of another solid image pickup device used for the present invention.

FIG. 8 is a circuit diagram of one pixel and a readout circuit according to the present invention.

Numerals 901 and 901' denote power supply lines for applying the reset voltage and the power supply voltage of an amplification transistor. Numerals 902 and 902' denote reset switch lines for controlling the operation of the reset switches Q2 and Q2'. Numeral 904 denotes a signal output line. Numeral 905 denotes a photodiode. Numerals 906 and 906' denote transfer switch lines for controlling the operation of transfer switches Q1 and Q1', respectively.

In Embodiments 1 and 2, one source follower was disposed for each pixel and the input part of a source follower was reset in the time series for every readout.

In this embodiment, two source followers Q3 and Q3' are disposed for each pixel. Here, the input parts of source followers Q3 and Q3' are simultaneously reset by turning the reset switches Q2 and Q2' to ON.

Thereafter, the selective switch Q4, the noise switch of the switch S1, the selective switch Q4' and the noise switch of the switch S2 successively turn ON/OFF to retain reset noise signals in the noise capacities respectively connected to the switches S1 and S2.

Subsequently, the transfer switches Q2 and Q2' successively or simultaneously turn ON/OFF to transfer charges to the input parts of source followers Q3 and Q3' and the selective switches Q4 and Q4' successively turn ON/OFF to retain signal outputs containing light signal information in capacities respectively connected to the switches S1 and S2.

And, using a horizontal scanning circuit, signals are outputted while added, subjected to noise suppression treatment and outputted.

Embodiment 4

Figure 9:
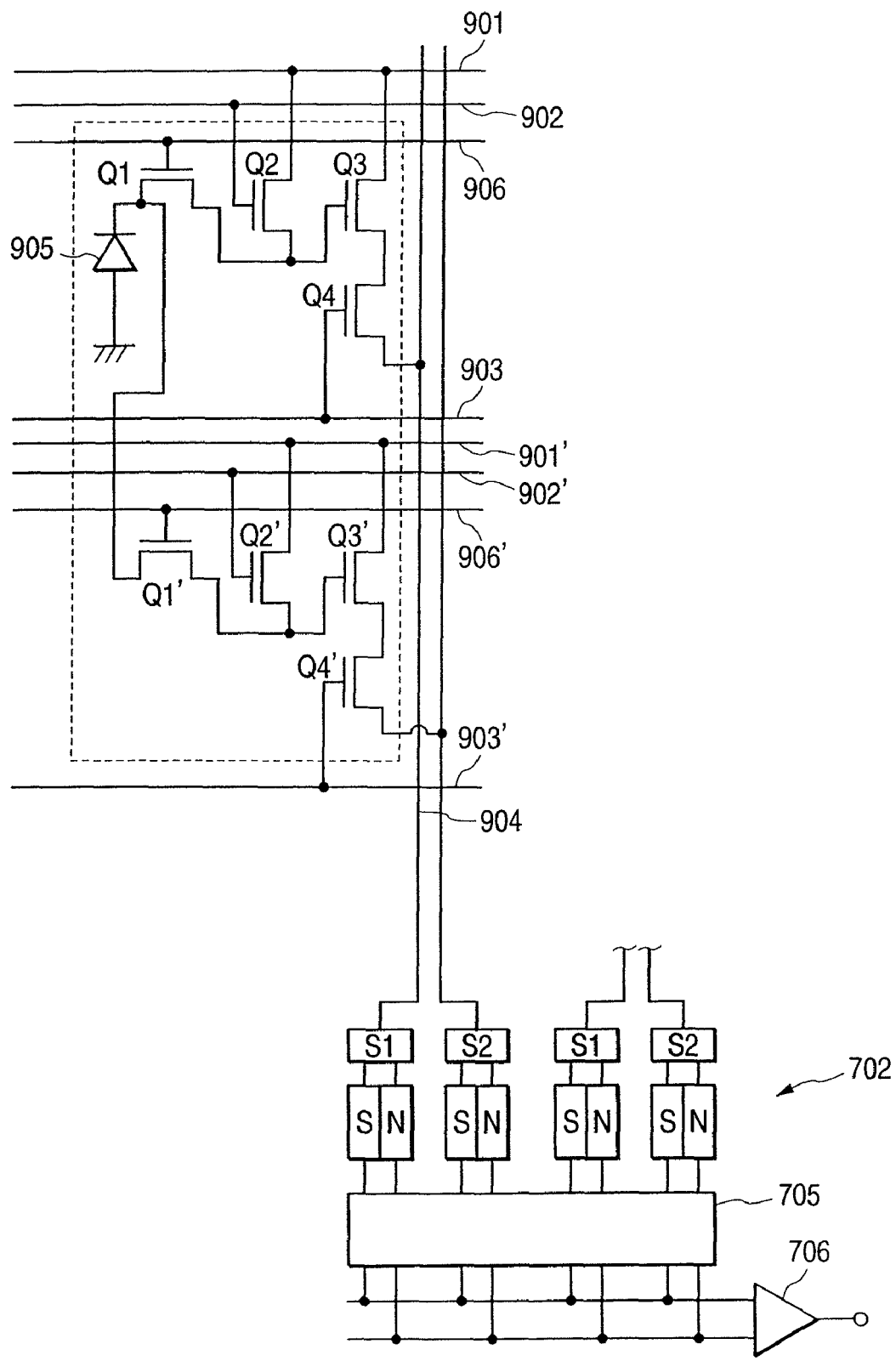
FIG. 9 is a circuit diagram of still another solid image pickup device used for the present invention.

FIG. 9 is a circuit diagram of a solid image pickup device according to Embodiment 4.

Here, a second signal output line 904' is disposed in parallel with a first signal output line 904 and signal outputs containing noise signals and light signals can be read out in parallel by reading out the output of a source follower Q3' onto the second signal output line. Namely, the selective switches Q4 and Q4' can simultaneously turn ON/OFF.

According to this embodiment, a light signal was obtained at a low voltage and in a wide dynamic range similarly as in Embodiment 1 and at the same time the readout time could be shortened though the pixel size increases as compared with Embodiments 1 and 2.

Embodiment 5

For example, by modifying the readout circuit of a solid image pickup device according to Embodiment 1, successively readout signals are respectively converted into digital signals and thereafter addition of signals can be performed also.

Figure 10:
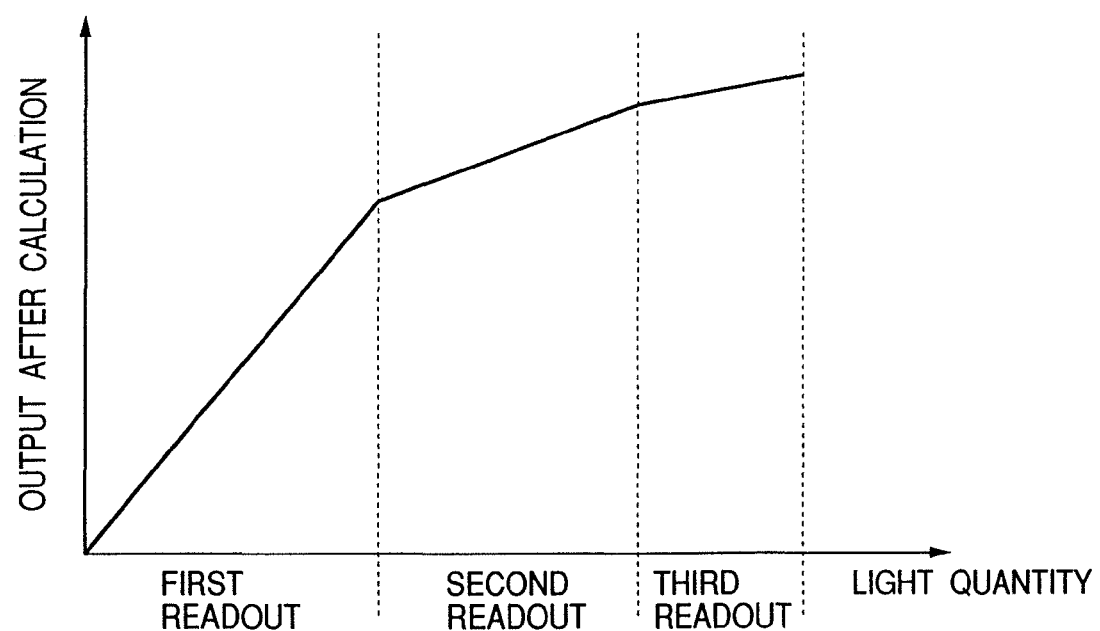
FIG. 10 is a graph showing one example of relationship between the light quantity and an output signal after the calculation.

In this digital processing, since weighted addition using variable weights can be easily performed, as a result, addition of signals can be set as programmable, for example, as shown in FIG. 10. Using this method enables, for example, the sensitivity to be varied corresponding to different ranges of light quantity.

Embodiment 6

Figure 11:
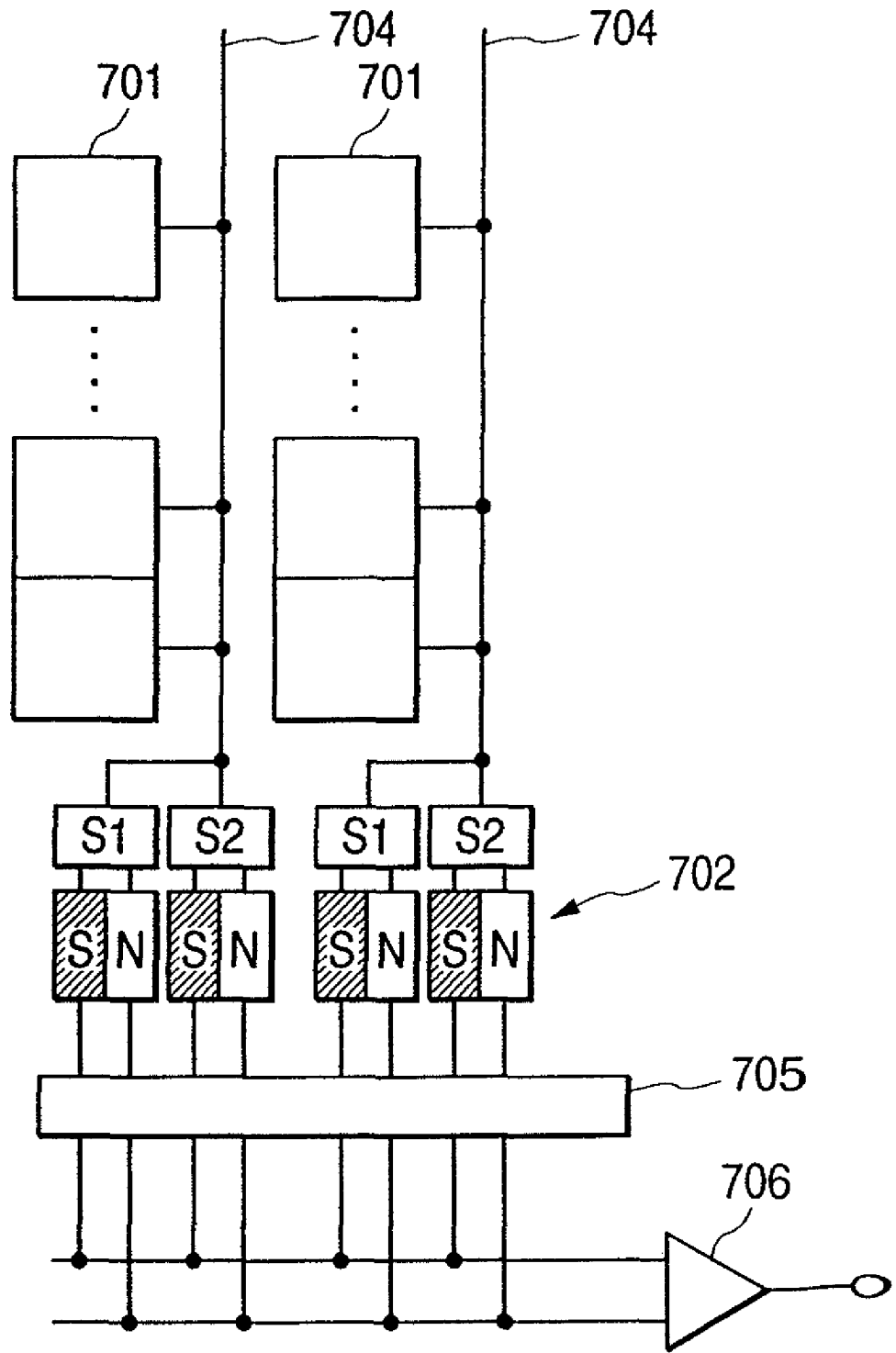
FIG. 11 is a circuit diagram of another readout circuit used for the present invention.

The circuit of a solid image pickup device according to Embodiment 6 is shown in FIG. 11. A basic configuration and operation is the same as those of Embodiment 2. The difference is that the capacity CFD of the charge-voltage conversion part corresponding to the input part of a source follower is decreased and the number of readout capacity sets for each signal output line is reduced from three sets to two sets so as to perform a transfer and a readout in two operations.

To be specific, the capacity CFD of the charge-voltage conversion part corresponding to the input part of a source follower was set to the order of 4fF to promote the sensitivity.

On the order of CFD=7fF, the charge conversion coefficient per electron in the input part is 23 μV/electron.

This embodiment was so designed as to set CFD to the order of 4fF and to set the charge conversion coefficient to 40 μV/electron.

In the prior art, a decrease in capacity value for enhancing the sensitivity led to the corresponding lowering of the dynamic range. To be specific, the handlable charge decreases to 57% and elevating the sensitivity and enlarging the dynamic range were hardly compatible.

In this embodiment, the power supply voltage is set to 5.0 volts and the maximum charge quantity accumulatable in a photodiode can be completely transferred and read out by twice readout, and the signals read out by twice readout were added on a common horizontal output line. As a result, the sensitivity can be enhanced about double while ensuring the dynamic range.

Embodiment 7

Figure 12:
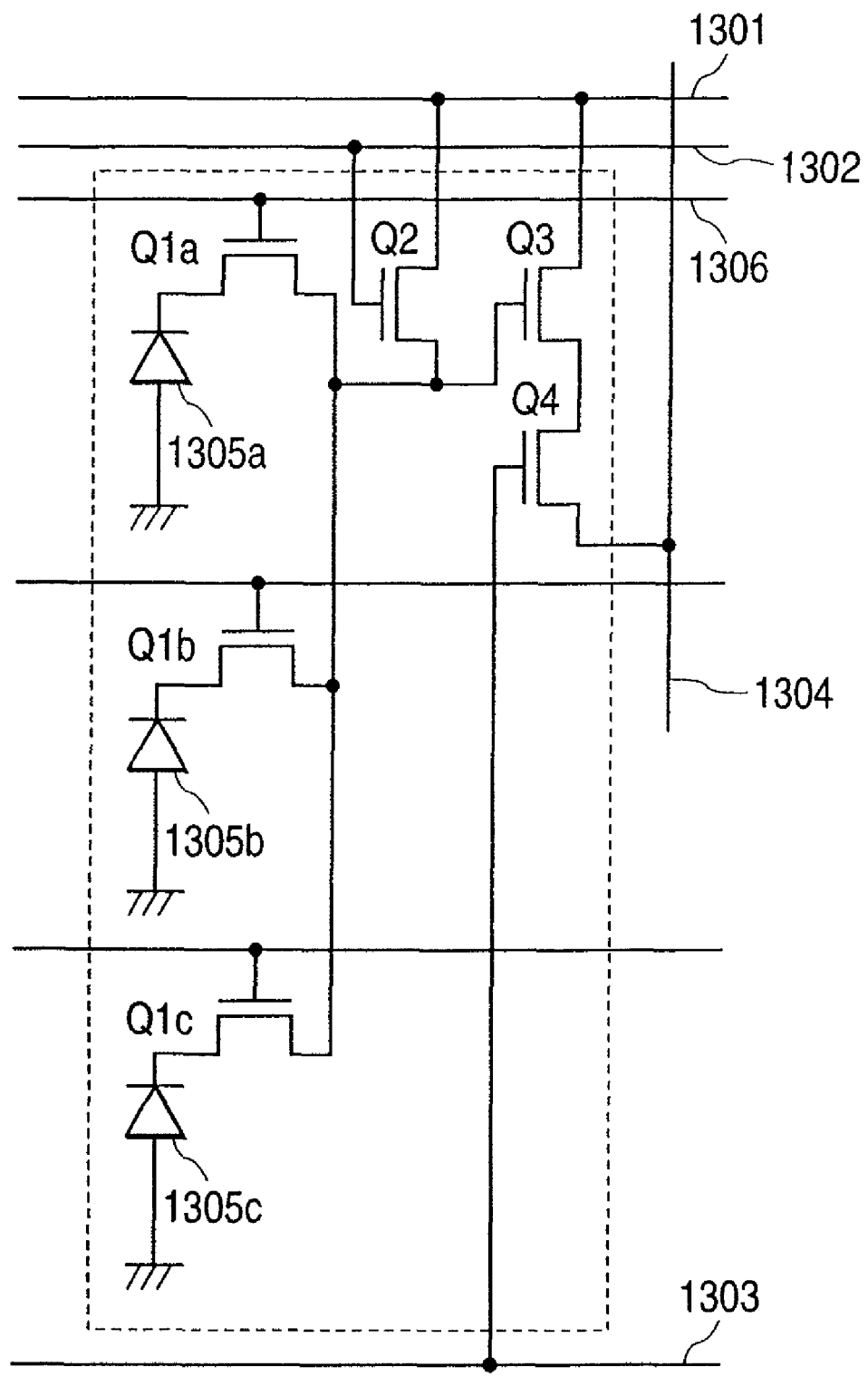
FIG. 12 is a circuit diagram of still another readout circuit used for the present invention.

The circuit diagram of three pixels of a solid image pickup device according to Embodiment 7 is shown in FIG. 12.

In this embodiment, three pixels are formed by connecting a source follower amplifier as single amplification means, a selective switch and a reset switch to a photoelectric conversion part comprising three photodiodes and three transfer switches.

Numeral 1301 denotes a power supply line; 1302: a reset switch line; 1303: a selective switch line; 1305a to 1305c: photodiodes; and 1306: a transfer switch line.

This embodiment is characterized in that signals of individual photodiode can be selectively read out by ON/OFF of the respective transfer switches, and on the other hand, signals of three photodiodes are added on the input terminal of the source followers by simultaneous ON/OFF of three transfer switches. In case of adding three photodiodes, the signal amount increases as compared with the case of a single photodiode. Formerly, even when added, the signal amount was limited by the signal amplitude on the input terminal of a source follower, but the readout of a signal based on the charge accumulated for one unit of accumulation period by repeating several transfer operations enables all added signals to be read out on application of the present invention.

Besides, in the present invention, a mode using the second or subsequent signals without using the primary readout signal is selected to enable only signals above a predetermined exposure quantity to be extracted.

In case of three-time readout or more, for example, selection and addition of the second readout signal alone without addition of the primary signal would enable signals above a certain exposure quantity to be readily extracted without any digital computation.

Besides, since the power supply used for driving the pixel section can be set to 3.3 volts, the pixel section can be driven together with an AD converter by means of a single power supply. Furthermore, the pixel section and the AD converter can be readily fabricated on one and the same chip.

Besides, in the present invention, the N-type part and the P-type part can also be changed to each other.

Figure 13:
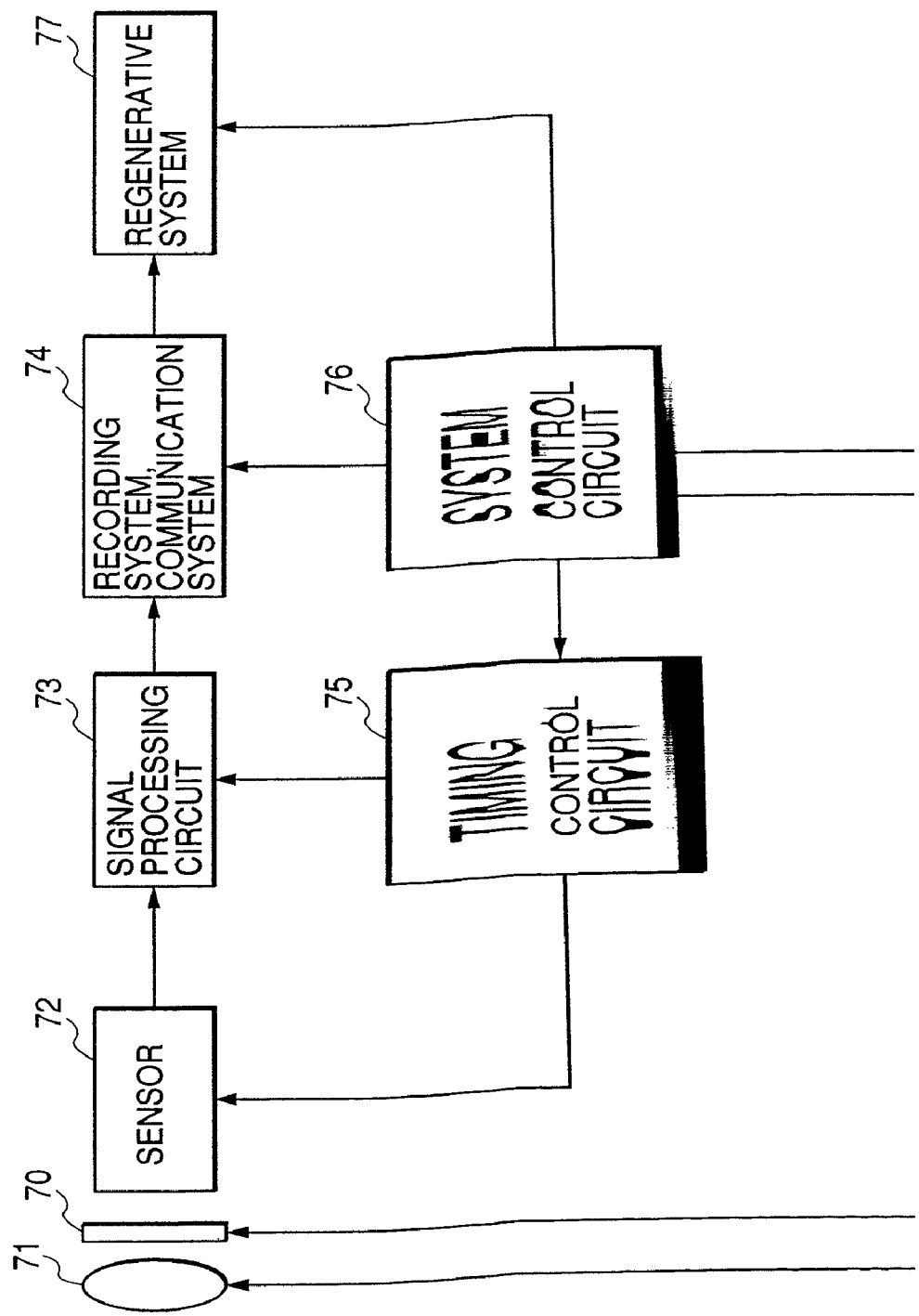
FIG. 13 is a block diagram of a image pickup system used for the present invention.
Figure 14:
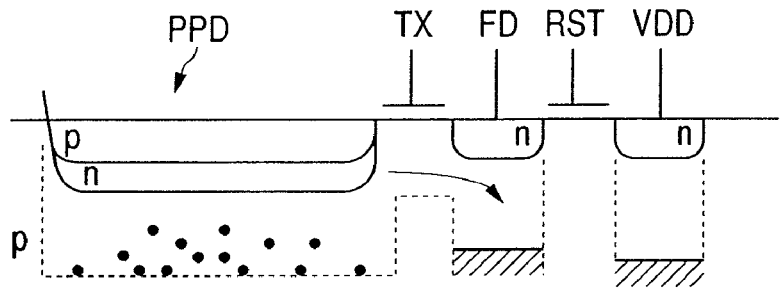
FIG. 14 is a schematic illustration of the operation of a conventional solid image pickup device.

FIG. 13 shows a schematic illustration of a system using the above image pickup device according to the present invention.

As shown in FIG. 13, the image ray incident through an optical system 71 is focused on the solid image pickup device 72. By means of the solid image pickup device 72, an light information is converted into an electric signal. The electric signal is subjected to signal conversion processing in a signal processing circuit 73 by a predetermined method such as white balance correction, gamma correction, brightness signal formation, color signal formation and contours correction and outputted. The signal subjected to signal processing is recorded or information-transferred by means of a recording system/communication system 74 in an information recorder. The signal recorded or transferred is regenerated by means of a regenerative system 77. The solid image pickup device 72 and the signal processing circuit 73 are controlled by a timing control circuit 75, while the optical system 71, the timing control circuit 75, the recording system/communication system 74 and the regenerative system 77 are controlled by a system control circuit 76. Either independent readout only or addition/thin-out readout only can be selected by the timing control circuit 75.

Numeral 70 denotes a mechanical shutter for determining the exposure time of the solid image pickup device 72, which is provided if necessary.

As described above, according to the embodiments of the present invention, the following effects can be obtained.

(1) Even for a lowered power voltage, a wide dynamic range of sensor signal can be obtained.

(2) Owing to the above effect (1), a more minute MOS transistor can be used and downsizing of a pixel is enabled.

(3) Since a minute MOS transistor becomes usable, a common use with a high performance digital IC is enabled at a single power supply.

(4) Since a minute MOS transistor becomes usable, a single chip can be formed with a high performance digital IC at a single power supply.

(5) Enhanced sensitivity becomes realizable without deterioration of dynamic range.

According to the present invention, it is possible to provide a solid image pickup device having a lower power consumption and a smaller noise ratio than the conventional device, and a driving method therefor as well as an image pickup system therefor.

Alternatively, it is possible without raising a power supply voltage or a reset voltage to provide a solid image pickup device capable of performing depletion transfer, and a driving method therefore as well as an image pickup system therefor.

What is claimed is:

1. A method of driving an image pickup device that includes a plurality of pixels, the plurality of pixels including a plurality of photoelectric conversion units, a shared signal amplification transistor that is shared by the plurality of photoelectric conversion units for amplifying signals generated in the plurality of photoelectric conversion units, an output node of the shared signal amplification unit being electrically connected to a vertical signal line, and a plurality of charge transfer units for transferring electric charges from each of the plurality of photoelectric conversion units to an input node of the shared signal amplification unit, the method comprising:

a first transferring step of transferring to the shared signal amplification unit a portion of photoelectric signal charges accumulated in a first photoelectric conversion unit;

a second transferring step of transferring to the shared signal amplification unit a portion of photoelectric signal charges accumulated in a second photoelectric conversion unit;

a first adding step of adding the signal charges transferred in the first transferring step and the signal charges transferred in the second transferring step at an input node of the shared signal amplification unit;

a third transferring step of transferring to the shared signal amplification unit a remaining portion of the photoelectric signal charges in the first photoelectric conversion unit, which remain from the first transferring step;

a fourth transferring step of transferring to the shared signal amplification unit a remaining portion of the photoelectric signal charges in the second photoelectric conversion unit, which remain from the second transferring step; and a second adding step of adding the signal charges transferred in the third transferring step and the signal charges transferred in the fourth transferring step at an input node of the shared signal amplification unit.

2. The method of driving an image pickup device according to claim 1, wherein the first transferring step and the second transferring step are carried out simultaneously, and the third transferring step and the fourth transferring step are carried out simultaneously.

* * * * *